(12) United States Patent
Bolle et al.

(10) Patent No.: US 8,102,584 B2
(45) Date of Patent: Jan. 24, 2012

(54) ENHANCED OPTICAL READOUT SCHEME FOR A THERMAL IMAGER EMPLOYING A RECONFIGURABLE SPATIAL LIGHT MODULATOR

(75) Inventors: Cristian A. Bolle, Bridgewater, NJ (US); Christopher D. W. Jones, Millington, NJ (US); Roland Ryf, Aberdeen, NJ (US); Maria E. Simon, New Providence, NJ (US)

(73) Assignee: Alcatel Lucent, Paris (FR)

( * ) Notice: Subject to any disclaimer, the term of this patent is extended or adjusted under 35 U.S.C. 154(b) by 447 days.

(21) Appl. No.: 12/195,124

(22) Filed: Aug. 20, 2008

(65) Prior Publication Data

US 2009/0009848 A1 Jan. 8, 2009

Related U.S. Application Data

(63) Continuation-in-part of application No. 11/766,430, filed on Jun. 21, 2007, now Pat. No. 7,851,759.

(51) Int. Cl.
*G02F 1/01* (2006.01)
*G02F 1/1335* (2006.01)

(52) U.S. Cl. ........ 359/238; 359/245; 359/263; 359/276; 359/290; 359/295; 359/298; 359/559; 359/560; 359/562; 359/563; 349/104; 349/128; 349/129; 349/130; 353/20; 353/31; 353/85; 353/97; 356/124; 356/330; 250/550; 250/559.42; 708/816

(58) Field of Classification Search .................. 359/237, 359/238, 245, 263, 276, 290–292, 295, 298, 359/279, 308, 559, 560, 562, 563; 349/104, 349/128–130; 353/20, 31, 85, 97; 356/124, 356/124.5, 310, 326, 328, 330; 250/550, 250/559.42; 708/816
See application file for complete search history.

(56) References Cited

U.S. PATENT DOCUMENTS

| | | | |
|---|---|---|---|
| 7,440,158 B2 * | 10/2008 | Giles et al. | 359/279 |
| 2006/0290777 A1 * | 12/2006 | Iwamoto et al. | 348/49 |

OTHER PUBLICATIONS

Vladimir Aksyuk, et al., "Infrared Imaging Apparatus"; U.S. Appl. No. 11/766,430, filed Jun. 21, 2007.
Vladimir Aksyuk, et al., "Detector of Infrared Radiation Having a Bi-Material Transducer"; U.S. Appl. No. 11/766,414, filed Jun. 21, 2007.
Giles, et al., "Direct Optical Image Projectors"; U.S. Appl. No. 11/713,207, filed Mar. 2, 2007.

* cited by examiner

*Primary Examiner* — Evelyn A. Lester
(74) *Attorney, Agent, or Firm* — Hitt Gaines, PC

(57) ABSTRACT

An apparatus includes a reconfigurable spatial light modulator capable of spatially modulating an incident wavefront responsive to an image formed on the modulator. A light source is configured to direct a coherent illumination light beam towards the modulator such that the modulator produces a modulated outgoing light beam therefrom. A filter is configured to spatially filter a light pattern formed by the outgoing light beam on a plane to selectively transmit light from a plurality of diffraction peaks therein.

25 Claims, 19 Drawing Sheets

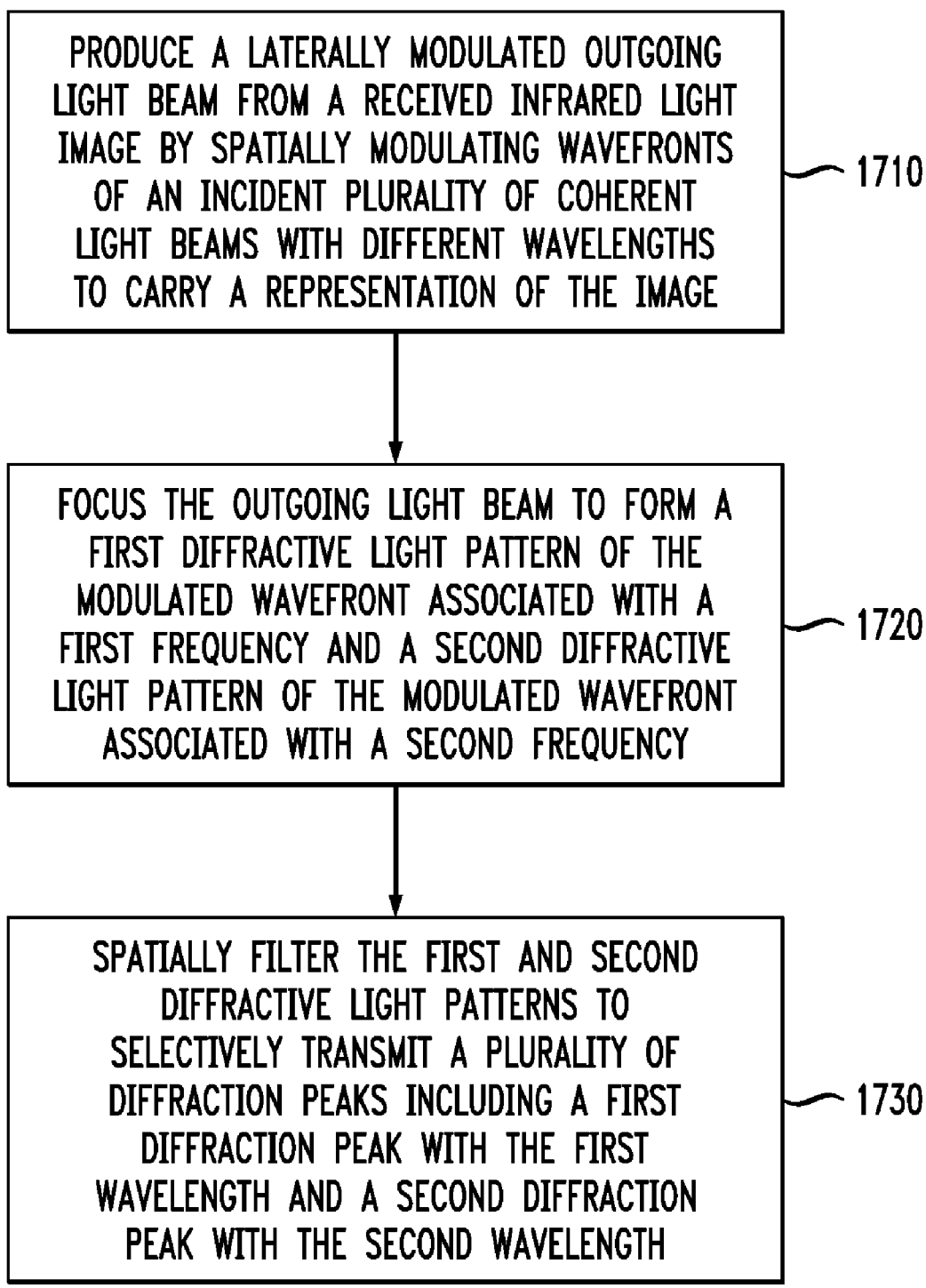

US 8,102,584 B2

ENHANCED OPTICAL READOUT SCHEME FOR A THERMAL IMAGER EMPLOYING A RECONFIGURABLE SPATIAL LIGHT MODULATOR

CROSS-REFERENCE TO RELATED APPLICATIONS

This application is a continuation-in-part of U.S. patent application Ser. No. 11/766,430, entitled "Infrared Imaging Apparatus", filed on 21 Jun. 2007 now U.S. Pat. No. 7,851,759 (the '430 application). The above-listed application is commonly assigned with the present invention and is incorporated herein by reference as if reproduced herein in its entirety. The present application is related to U.S. patent application Ser. Nos. 11/766,414 to Aksyuk, et al. (the '414 application), and 11/713,207 to Giles, et al. (the '207 application), both of which are incorporated herein by reference as if reproduced herein in their entirety.

TECHNICAL FIELD OF THE INVENTION

The invention is directed, in general, to a thermal imager.

BACKGROUND OF THE INVENTION

A thermal imager presents a user with a visible representation of infrared light emitted by an object. Such a device makes it possible to, e.g., perceive the objects in the dark, or to determine relative temperatures of multiple objects in a scene.

SUMMARY OF THE INVENTION

One embodiment is an apparatus that includes a reconfigurable spatial light modulator capable of spatially modulating an incident wavefront responsive to an image formed on the modulator. A light source is configured to direct a coherent illumination light beam towards the modulator such that the modulator produces a modulated outgoing light beam therefrom. A filter is configured to spatially filter a light pattern formed by the outgoing light beam on a plane to selectively transmit light from a plurality of diffraction peaks therein.

Another embodiment is an apparatus that includes a reconfigurable spatial light modulator capable of spatially modulating an incident wavefront responsive to an image formed on the modulator. An optical source is configured to produce coherent light including a first wavelength and a different second wavelength. The optical source directs the produced light towards the reconfigurable spatial light modulator such that the modulator produces a modulated outgoing light beam therefrom. The apparatus also includes a filter configured to spatially filter a light pattern formed by the outgoing light beam along a plane. The filtering selectively transmits light from a plurality of diffraction peaks of the pattern such that light of the first wavelength is transmitted by a first of the diffraction peaks with a first attenuation and light of the different second wavelength is transmitted by a second of the diffraction peaks with a second attenuation.

Another embodiment is a method that includes producing a laterally modulated outgoing light beam by spatially modulating wavefronts of an incident coherent light beam to carry a representation of an infrared light image. The outgoing light beam is focused to form a diffractive light pattern having diffraction peaks. The method includes spatially filtering the diffractive light pattern to selectively transmit a first diffraction peak and a second diffraction peak.

Another embodiment is a method that includes receiving an infrared light image. A laterally modulated outgoing light beam is produced by spatially modulating wavefronts of an incident plurality of coherent light beams to carry a representation of the image. The coherent light beams have different wavelengths. The outgoing light beam is focused to form a first diffractive light pattern of the modulated wavefront associated with a first frequency and a second diffractive light pattern of the modulated wavefront associated with a second frequency. The method includes spatially filtering the first and second diffractive light patterns to selectively transmit a plurality of diffraction peaks that includes a first diffraction peak with the first wavelength and a second diffraction peak with the second wavelength.

BRIEF DESCRIPTION OF THE DRAWINGS

For a more complete understanding of the invention, reference is now made to the following descriptions taken in conjunction with the accompanying drawings, in which:

FIG. 17 presents a flow chart of an example method of the disclosure for producing a visible image from an IR image using multiple wavelengths of visible light.

DETAILED DESCRIPTION

A thermal imager receives light at one or more wavelengths not directly visible to the human eye, e.g., IR light, and creates an image that can be viewed in visible wavelengths. Night vision goggles are a familiar example a thermal imager. The cost and power consumption of such devices has historically been high, in part from the use of exotic materials and cooling techniques. However, recent advances in thermal imaging technology have made it possible to reduce the cost and power consumption of thermal imagers. One technique, disclosed in the '414 application, uses an array of micro-electrical-mechanical system (MEMS) pixel mirrors to form a reconfigurable spatial light modulator. The pixel mirrors are configured to change a displacement from a substrate in response to illumination by infrared light. For example, one subset of pixel mirrors may be configured to increase displacement from the substrate when illuminated, and another subset may decrease displacement. The pixel mirrors are configured to reflect visible light. The difference in position between upwardly displaced and downwardly displaced pixel mirrors may create a diffraction pattern from which a visible representation may be constructed of the scene from which the IR light originates IR light ranges in wavelength from about 0.8 µm to about 1 mm. Two wavelength ranges, a mid-wavelength band from about 3.0 µm to about 5.5 µm, and a long-wavelength band from about 8 µm to about 14 µm, are sometimes referred to as thermal imaging bands due to atmospheric transmission windows that advantageously allow efficient propagation of IR radiation. In the context of thermal imaging, one of these narrower bands is preferred. In some cases, the mid-wavelength band is most preferred. A reconfigurable spatial light modulator may be configured to be most responsive to light in a thermal imaging band, but the embodiments described herein are not limited in application to these bands. As used herein, visible light refers to electromagnetic wavelengths ranging from about 380 nm to about 750 nm. Non-visible light refers to electromagnetic wavelengths that do not constitute visible light.

Turning to FIGS. 1A-1D, example embodiments of a reconfigurable spatial light modulator 100 are illustrated. The reconfigurable spatial light modulator is capable of producing spatially varying amplitude and/or phase modulations of an incident light wavefront in response to received infrared light. A disclosure of the reconfigurable spatial light modulator 100 is made, e.g., in the '414 application, and aspects thereof are summarized here. This summary is limited to that information necessary to provide a context for the embodiments described herein. Furthermore, the invention is not limited to the illustrated embodiments of the reconfigurable spatial light modulator 100.

Figure 1A:
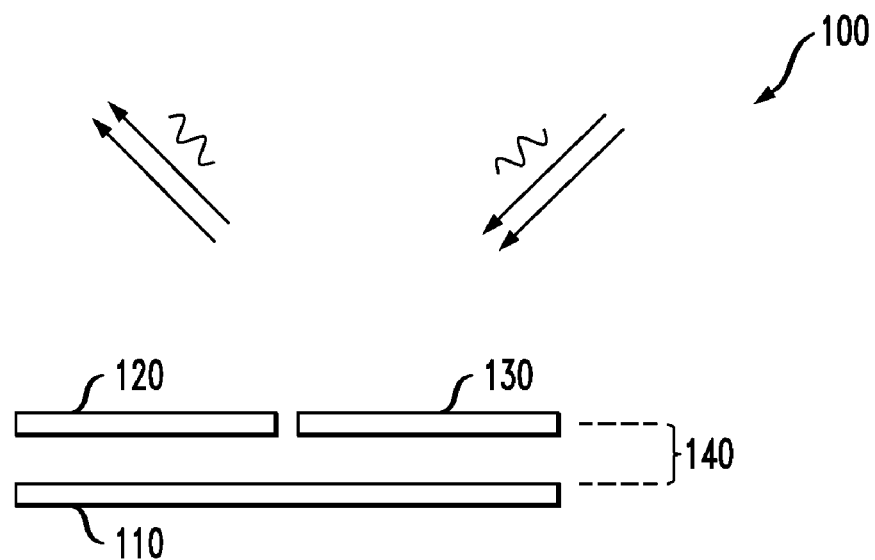
FIGS. 1A-1D illustrate aspects of example reconfigurable spatial light modulators.
Figure 1B:
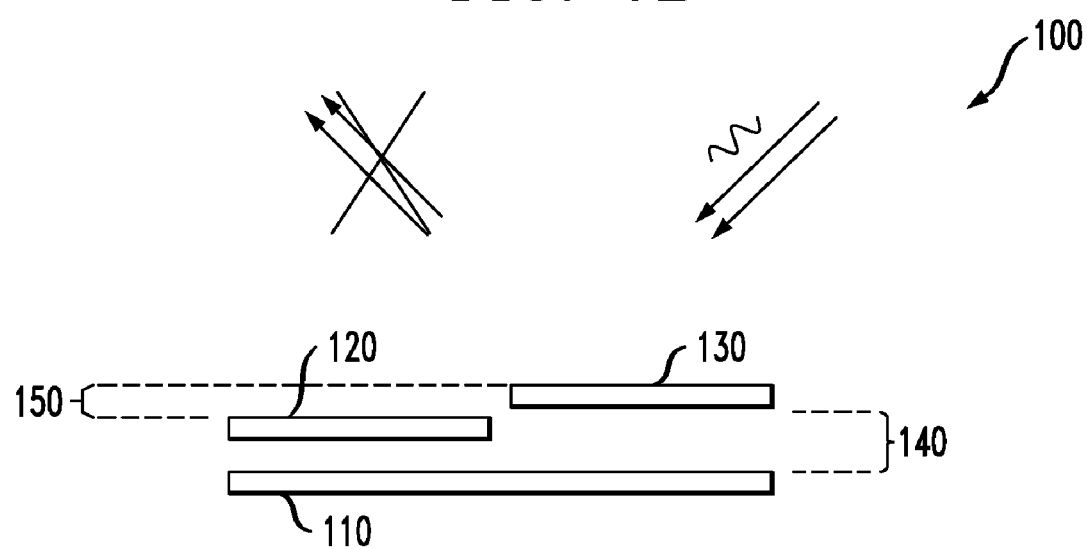

The reconfigurable spatial light modulator 100 includes a substrate 110 and pixel mirrors 120, 130 thereover. The substrate 110 provides a reference plane with respect to displacements of the pixel mirrors 120, 130. The pixel mirrors 120, 130 have an equilibrium displacement 140 with respect to the substrate 110. The pixel mirror 120 is configured to decrease its displacement from the surface of the substrate 110 in response to an increase in its temperature, whereas the pixel mirror 130 is configured to increase its displacement from the substrate 110 in response to an increase in its temperature. FIG. 1B illustrates the pixel mirrors 120, 130 displaced from their equilibrium displacement 140 in response to such increases in the temperatures thereof. Such displacements of the pixel mirrors 120, 130 results in a relative displacement 150 between the pixel mirrors 120, 130. The temperature of the pixel mirrors 120, 130 may change in response to, e.g., received IR light.

Figure 1C:
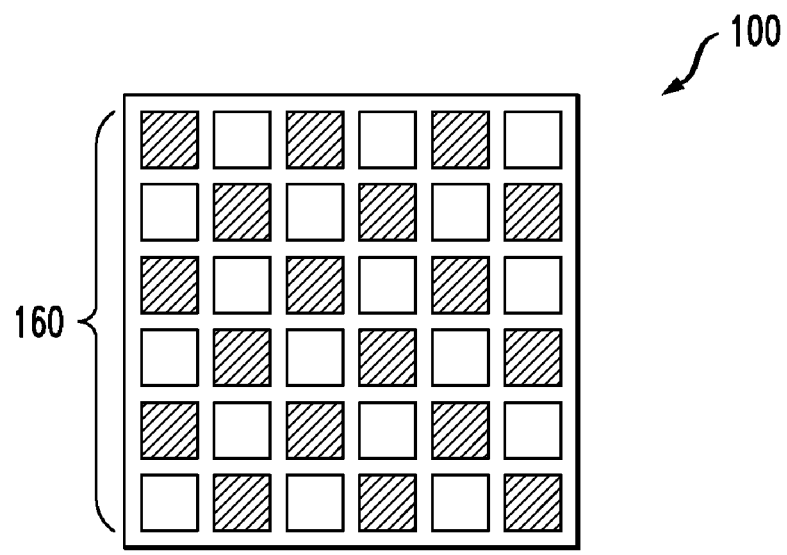

The pixel mirrors 120, 130 may be arranged with respect to each other as, e.g., a two-dimensional interleaved array, illustrated in FIG. 1C and referred to herein as a checkerboard array 160. In another configuration, the pixel mirrors 120, 130 may be arranged with respect to each other as, e.g., a one-dimensional interleaved array, illustrated in FIG. 1D and referred to herein as a linear array 170. Of course, other configurations are possible, as described in the '207, '414 and '430 applications. Herein, example embodiments are presented using the linear array 170. In general, the optical response of the reconfigurable spatial light modulator 100 may depend on the configuration of the pixel mirrors 120, 130, so that other configurations may yield different results from those presented herein.

When the pixel mirrors 120, 130 are illuminated with coherent light with wavelength λ, light reflected therefrom may interfere in a manner dependent on the relative displacement 150. For example, when the relative displacement 150 of two adjacent pixel mirrors 120, 130 is about zero, as illustrated in FIG. 1A, the light reflected therefrom is in phase and constructively interacts. As the pixel mirrors 120, 130 warm and the relative displacement 150 increases above zero, as illustrated in FIG. 1B, a phase difference between the light reflected from the pixel mirrors 120, 130 increases and the light may destructively interfere for some value of the relative displacement 150. The intensity of such combined light may decrease to zero when the relative displacement of the pixel mirrors 120, 130 is about λ/4. As relative displacement 150 increases further, the intensity of the combined light increases up to a maximum when the relative displacement 150 is about λ/2.

Figure 2A:
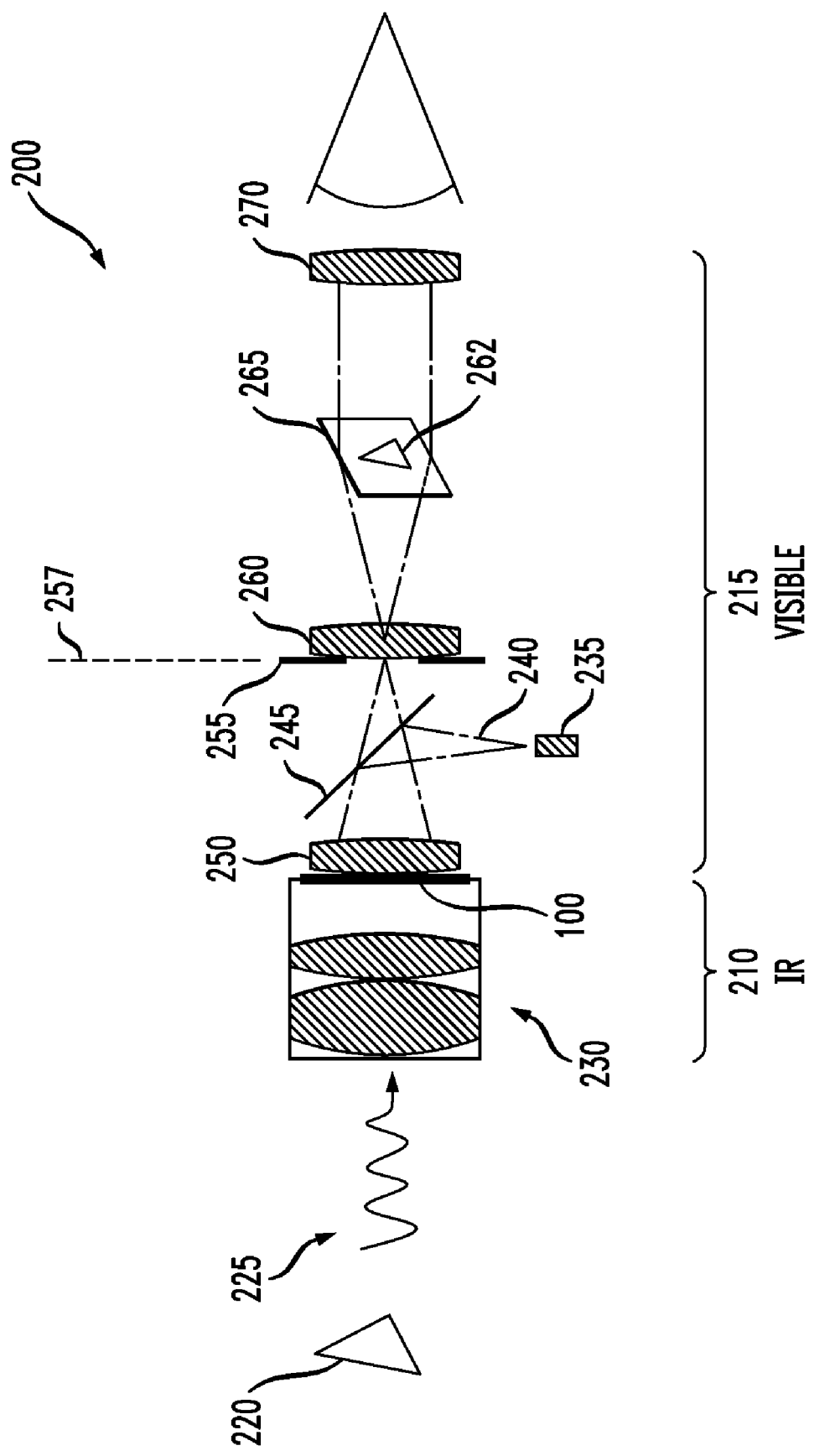
FIG. 2A illustrates an example MEMS IR imaging system.

FIG. 2A illustrates one embodiment of an IR imager 200 including the reconfigurable spatial light modulator 100. This embodiment is understood to be one of various possible configurations, and is presented without limitation to guide the following discussion. The reconfigurable spatial light modulator 100 divides the IR imager 200 for discussion purposes into an IR optics section 210 and a visible optics section 215. An object 220, e.g., emits IR light 225, which enters the IR optics section 210. IR lenses 230 focus the IR light 225 onto the reconfigurable spatial light modulator 100.

A coherent visible light source 235, e.g. a laser, produces coherent light 240 with wavelength $\lambda_c$. Beam expansion optics (not shown) direct the coherent light 240 to an optical beam redirector 245. As described in the '207 application, the coherent light 240 is directed to the reconfigurable spatial light modulator 100. The coherent light 240 is reflected from the surface of the reconfigurable spatial light modulator 100 and focused by a lens 250. In some embodiments, a quarter wave plate (not shown) is placed between the reconfigurable spatial light modulator 100 and the lens 250, e.g., so that light reflected by the spatial light modulator 100 is transmitted towards the lens 260 rather than being directed back towards the laser 235. The IR imager 200 is configured to pass the coherent light 240 to a filter 255, e.g., a spatial filter, placed at a focal plane 257 of the lens 250. A lens 260 focuses an image 262 onto a screen 265. The image may be viewed by, e.g., viewing optics 270.

Figure 2B:
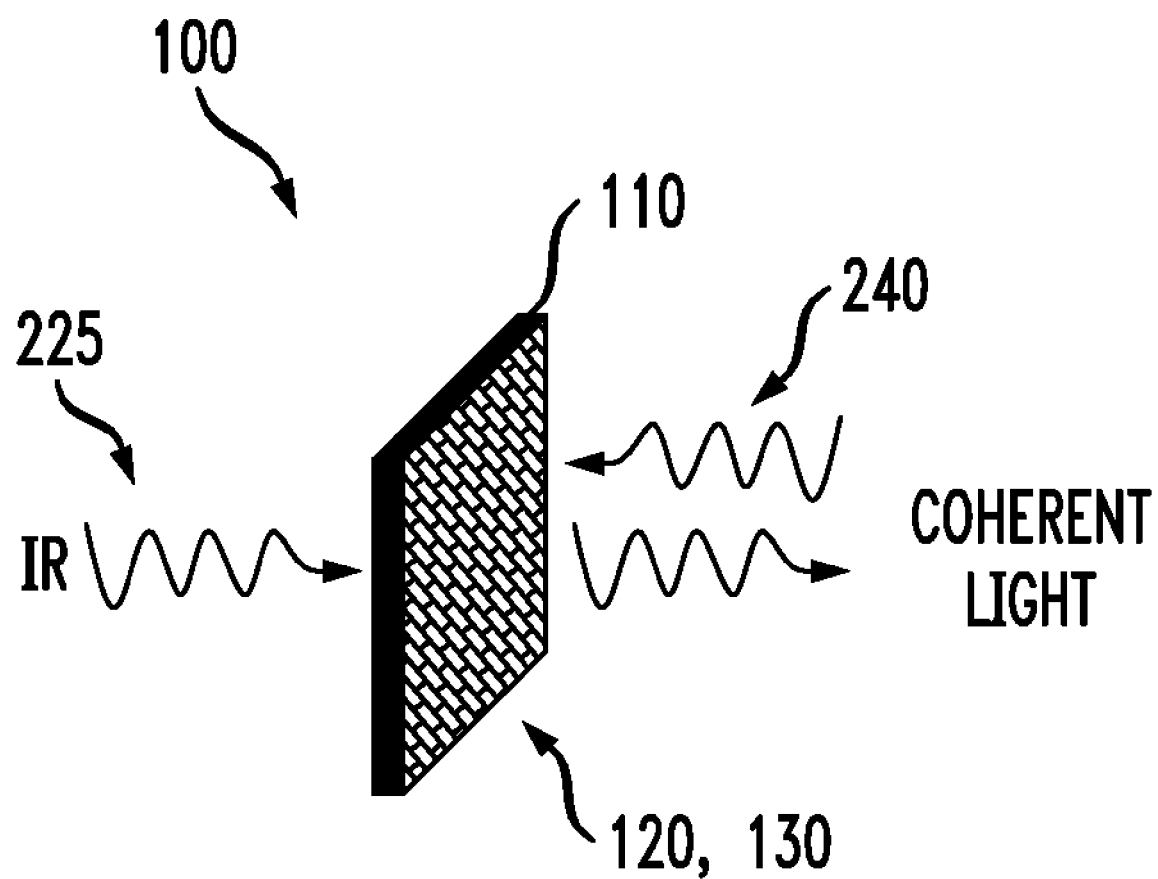
FIG. 2B illustrates an example reconfigurable spatial light modulator illuminated with light.

FIG. 2B illustrates the reconfigurable spatial light modulator 100 in isolation. The IR light 225 from the object 220 illuminates one side of the reconfigurable spatial light modulator 100. The coherent light 240 is reflected from the pixel mirrors 120, 130. In some cases the reconfigurable spatial light modulator 100 is fabricated on a substrate 110 that is at least partially transparent to at least some wavelengths of light in the IR band, e.g., ranging from about 0.8 μm to about 1 mm. More particularly, the substrate 110 may be at least partially transparent to light with a wavelength falling within a thermal imaging band. In a non-limiting example, the substrate is silicon, which has an IR pass band.

Figure 18:
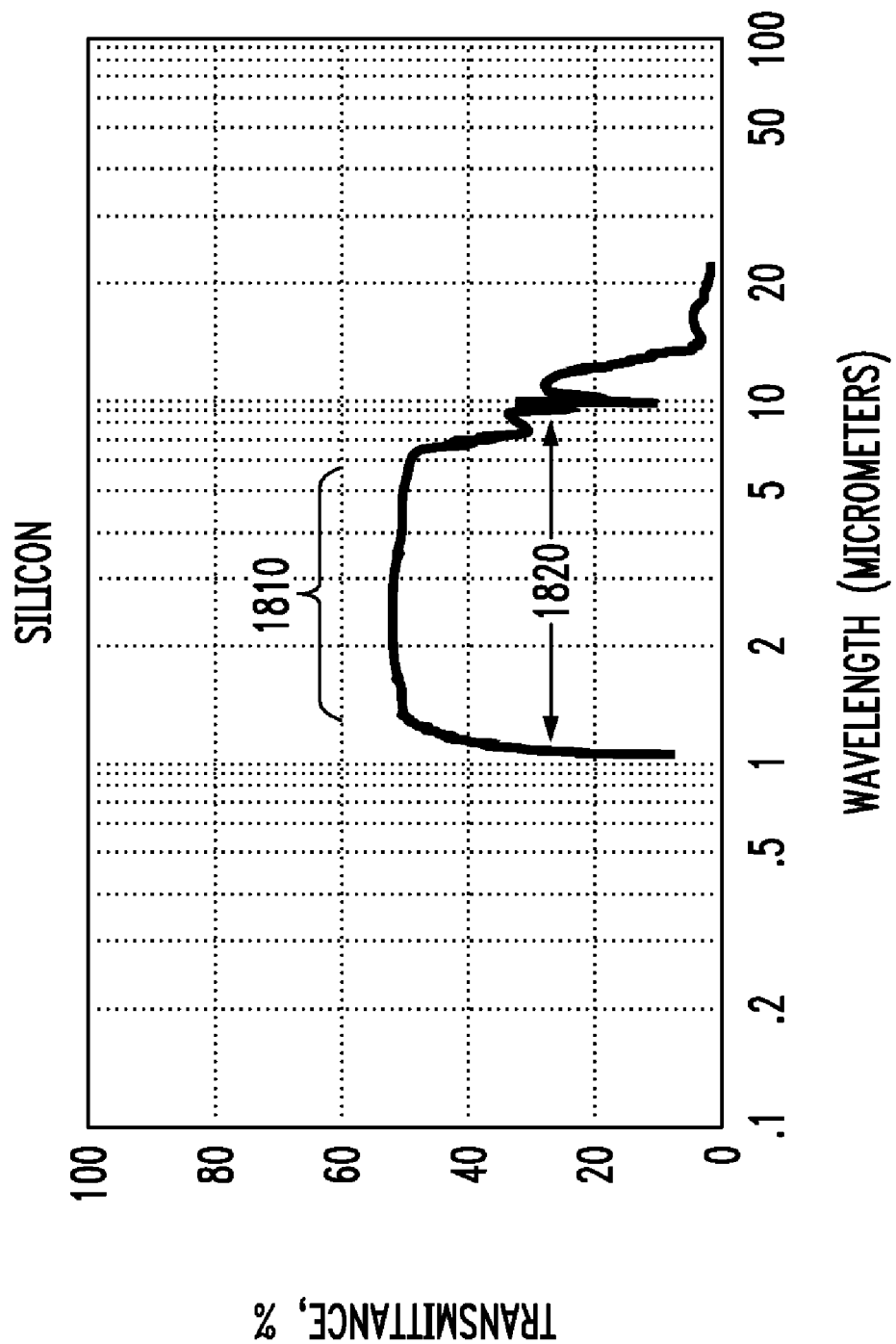
FIG. 18 presents a transmittance characteristic of an example silicon layer.

FIG. 18 illustrates an example transmittance characteristic of a silicon layer without limitation. Actual transmittance values will depend on, e.g., thickness of the layer. The characteristic displays a wavelength range 1810, e.g. about 1.5 μm to about 6 μm, in which the transmittance is relatively constant. The characteristic also has a larger range 1820 corresponding to the full width/half maximum wavelength band, e.g., about 1 μm to about 9 μm. Either the range 1810 or the range 1820 or any other conventional definition of pass band is within the scope of the present discussion. Advantageously, this pass band includes wavelengths in the mid-wavelength IR band, e.g., from about 3.0 μm to about 5.5 μm. A portion of the IR light 225 propagates through the substrate 110 and the energy associated with the IR light 225 is converted to heat in the vicinity of the pixel mirrors 120, 130. The heat causes the pixel mirrors 120, 130 to translate relative to the substrate 110 and develop a non-zero relative displacement 150 therebetween. As discussed previously, the relative displacement results in displacement-dependent interference of the coherent light 240 from the reconfigurable spatial light modulator 100. The affect of reflecting the coherent light 240 from the pixel mirrors 120, 130 is to produce a laterally modulated outgoing light beam, e.g., modulated laterally with respect to the operating surface of the reconfigurable spatial light modulator 100.

The combined effect of interference between the pixel mirrors 120, 130 in the reconfigurable spatial light modulator 100 produces a pattern of diffraction peaks at the focal plane 257. As used herein, a diffraction peak is associated with only one wavelength of light. Two diffraction peaks at different wavelengths may be co-located at, e.g., a focal plane, meaning they overlap in space at the focal plane. However, such diffraction peaks are regarded as two peaks, even though overlapping, so that a single location of locally maximum intensity may include light from more than one wavelength. A first and a second diffraction peak have a different wavelength when a center wavelength of a Gaussian or other distribution of light associated with the first diffraction peak is different from a center wavelength associated with the second diffraction peak.

The pattern of diffraction peaks depends on the pattern of relative displacements 150 of pixel mirrors 120, 130 over the reconfigurable spatial light modulator 100. For example, when none of the pixel mirrors 120, 130 are relatively displaced, the reconfigurable spatial light modulator 100 acts essentially as a planar mirror. Light from a laser is reflected from all pixel elements with little or no relative phase shift, resulting in nearly specular reflection of the light. However, when some of the pixel mirrors 120, 130 are displaced, diffraction peaks will form on the image plane 257.

Figure 3A:
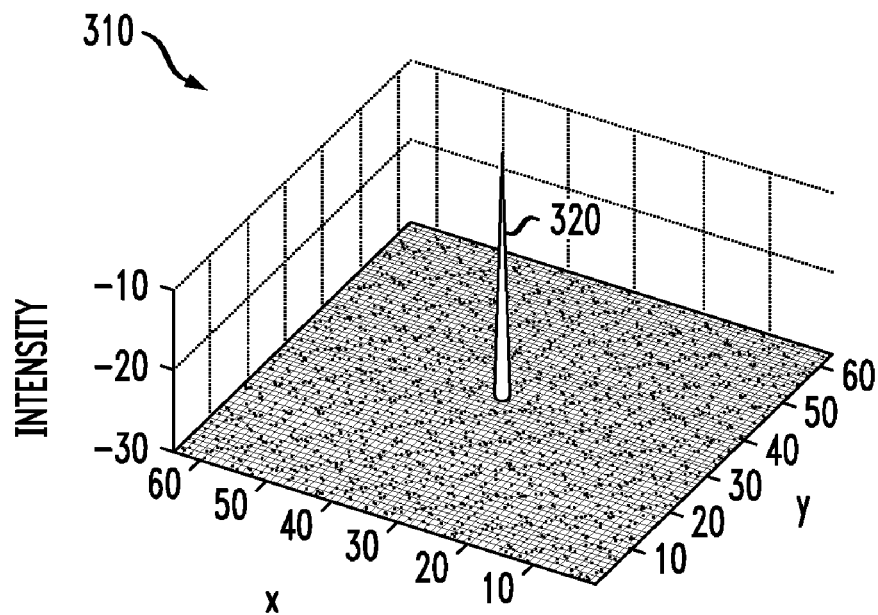
FIGS. 3A and 3B illustrate patterns of diffraction peaks from an example reconfigurable spatial light modulator.

FIG. 3A illustrates an example two-dimensional plot 310 of the intensity of light at the focal plane 257 (see FIG. 2A) in the case for which none of the pixel mirrors 120, 130 are relatively displaced. Substantially a single peak 320 at the center of the x-y space occurs, indicating that no diffraction of light results from the reflection of the coherent light 240. This single peak 320 is commonly referred to as the fundamental mode, and is referred to equivalently hereinafter as the zero order mode.

Figure 3B:
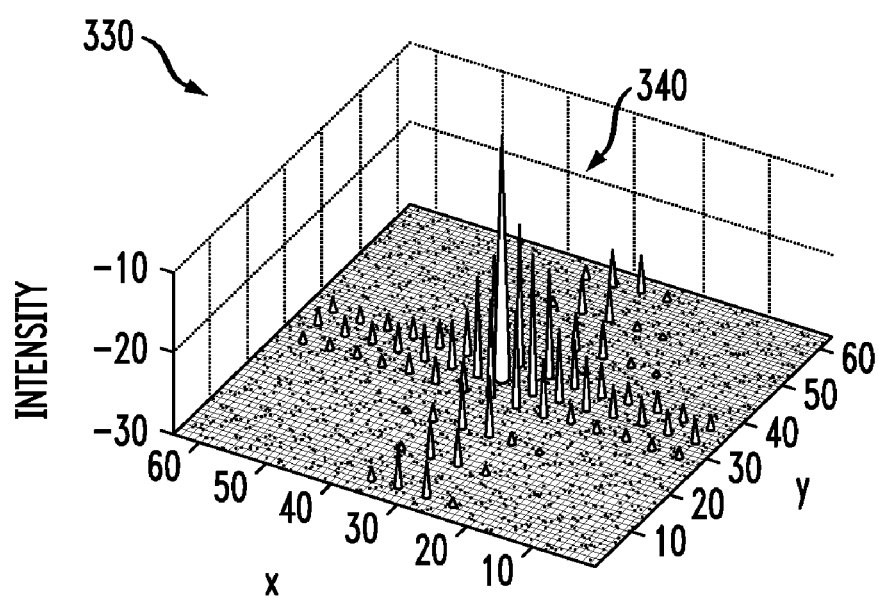

FIG. 3B illustrates a two-dimensional plot 330 of the intensity of light at the focal plane 257 in the case for which some of the pixel mirrors 120, 130 are displaced. The distribution of diffraction peaks 340 is characterized by the presence of the fundamental mode 320 in addition to several higher-order modes 345. The higher-order modes 345 convey information of the spatial distribution of displaced pixel mirrors in the reconfigurable spatial light modulator 100. In general, one higher order mode 345 may comprise more than one diffraction peak.

Figure 4:
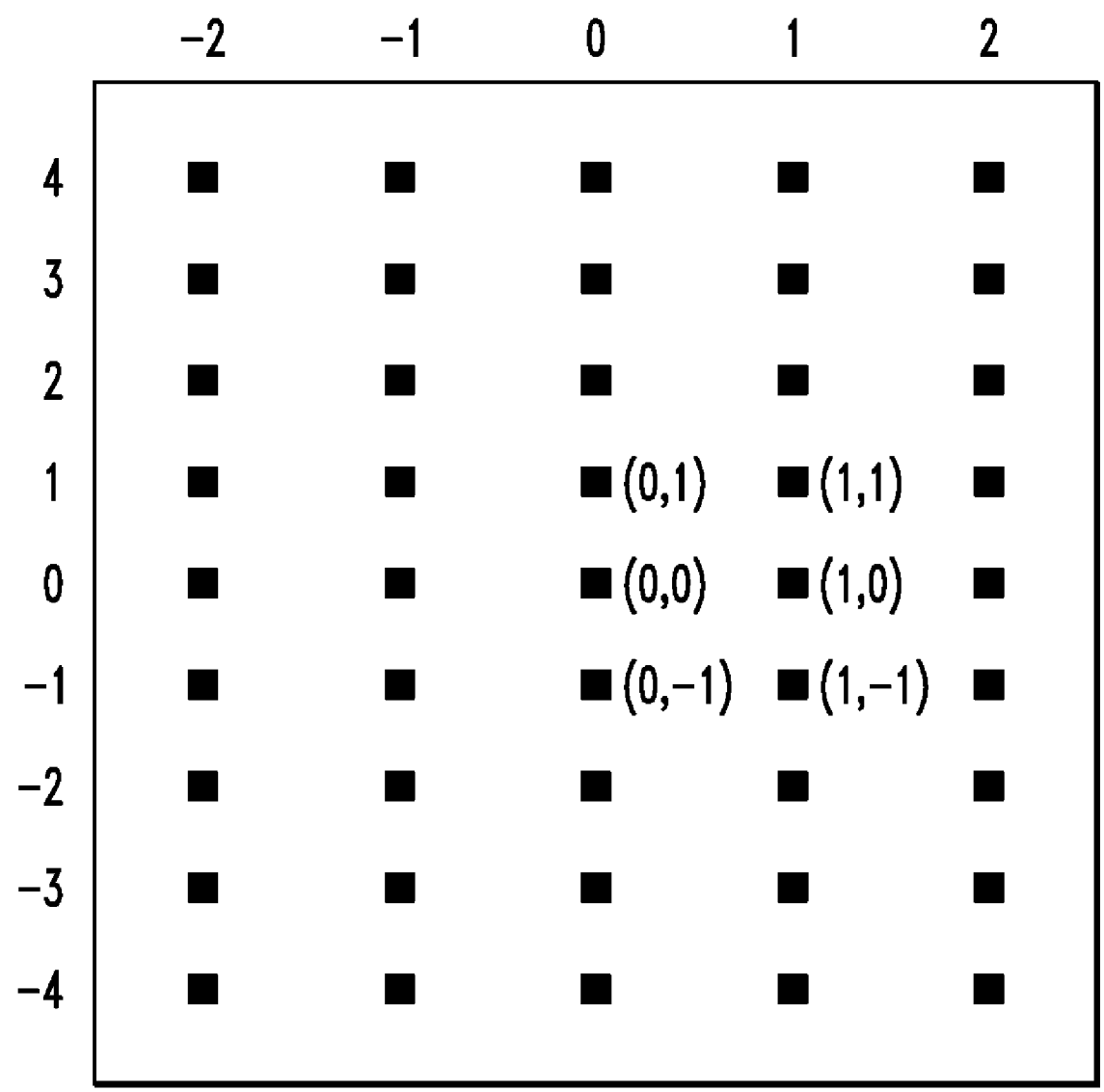
FIG. 4 illustrates position nomenclature of diffraction peaks on a reference grid.

Turning to FIG. 4, illustrated is an example reference grid 410 of locations illustrating the nomenclature used herein to describe the diffraction peaks 340 shown in FIG. 3B. The spot at location (0,0) is the fundamental diffraction mode, the peak 320. Five additional peak locations are highlighted at (0,1), (0,−1), (1,1), (1,−1), and (1,0), respectively referred to as the (0,1), (0,−1), (1,1), (1,−1), and (1,0) peaks. These peaks are members of a constellation of $1^{st}$ order peaks. In the illustrated embodiment, e.g., employing the linear array 170, the (0,1) and (0,−1) peaks convey the same information, neglecting asymmetry effects. Similarly, the (1,1) and the (1,1) peaks are about equivalent. Therefore, the (0,−1) and the (1,−1) peaks may be disregarded with a negligible loss of information. The distribution of energy among the peaks varies with the spatial distribution of displaced pixel mirrors in the reconfigurable spatial light modulator 100. While higher order diffraction peaks produced by the diffraction of the coherent light 240 (FIG. 2A) convey information about the object 220, most of the optical power is concentrated in the $1^{st}$ order diffraction peaks. In the present illustrated embodiment, the higher order peaks are therefore neglected. In other embodiments, one or more diffraction peaks associated with diffraction modes grater than the $1^{st}$ order are retained.

Figure 5:
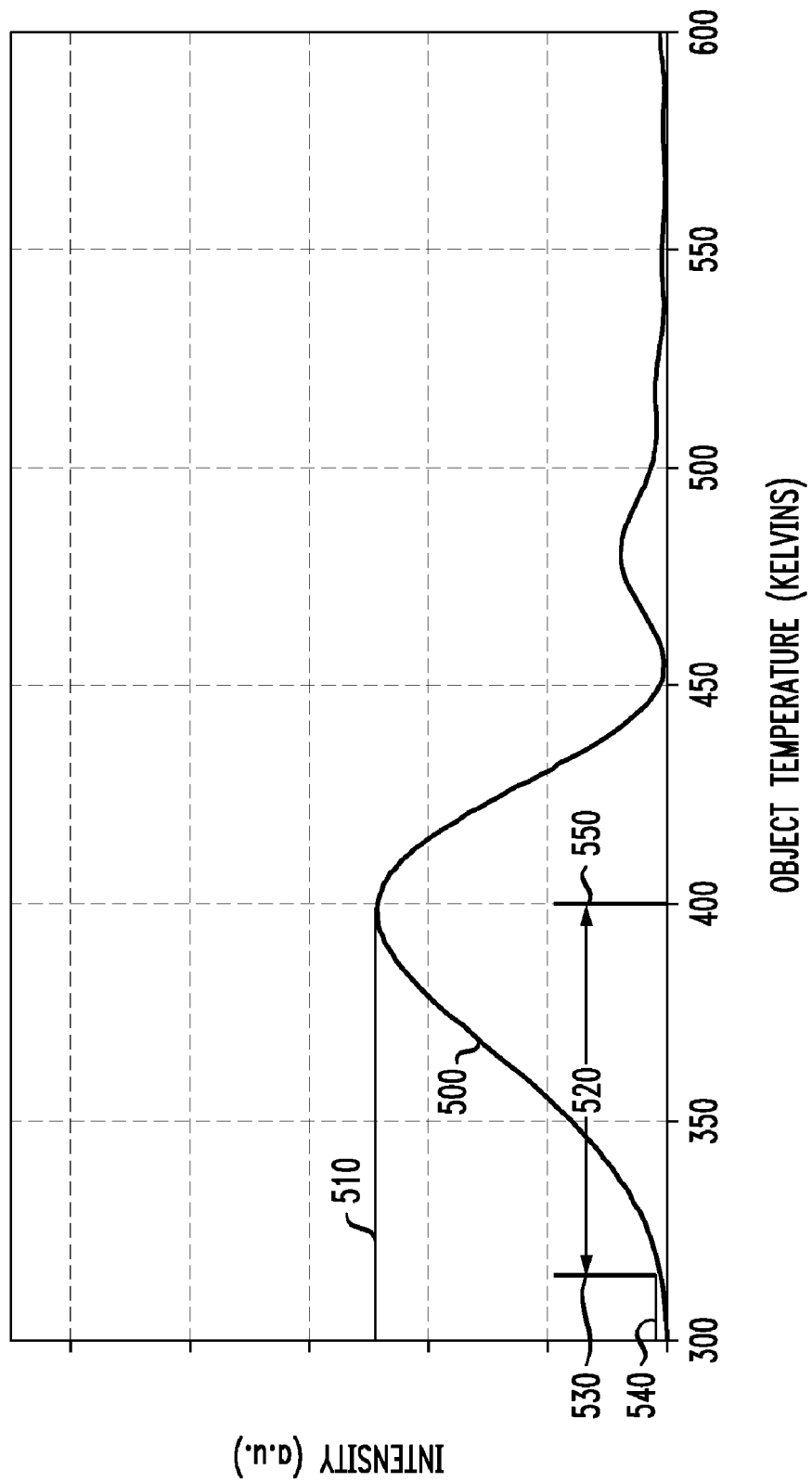
FIG. 5 illustrates a intensity response characteristic for a $1^{st}$ order diffraction peak at location (0,1) in one example specific embodiment of the disclosure.

FIG. 5 presents an intensity response 500 of the (0,1) peak in arbitrary units (a.u.) as a function of object temperature in Kelvins of one embodiment using the linear array 170. Herein the object temperature is assumed to be the blackbody temperature corresponding to received IR light of a particular wavelength. In general, a material-dependent and geometry-dependent correction could be applied to determine a true temperature of an object emitting the IR light. However, such correction is typically unnecessary for images perceived by the human eye, e.g. The intensity response 500 has a maximum intensity 510 at about 400 Kelvins and increases monotonically from about 300 Kelvins to about 400 Kelvins. Above 400 Kelvins, the magnitude of the intensity response decreases, or "rolls over." An object temperature response 520 is defined for purposes of the present discussion as having a lower object temperature value 530 associated with an intensity 540 that is about 5% of the maximum intensity 510. The object temperature response 520 has an upper object temperature value 550 that is associated with the maximum intensity 510. In the present example, the lower object temperature value 530 is about 320 Kelvins, and the upper object temperature value 550 is about 400 Kelvins. Thus, the span of the object temperature response 520 is about 80 Kelvins.

At a temperature above the temperature of the maximum intensity 510, the response is ambiguous, as two object temperatures are associated with the same intensity. Thus an IR imager 200 using only the (0,1) peak has an unambiguous intensity response temperature ranging from about 320 Kelvins to about 400 Kelvins, a range of about 80 Kelvins. Previous IR imagers have used only the (0,1) peak. While use of the (0,1) peak has been sufficient for some purposes, in some cases a larger operating range is desirable, e.g., when object temperatures in a scene exceed the temperature of maximum intensity of the (0,1) peak, about 400 Kelvins in the present example.

Figure 6:
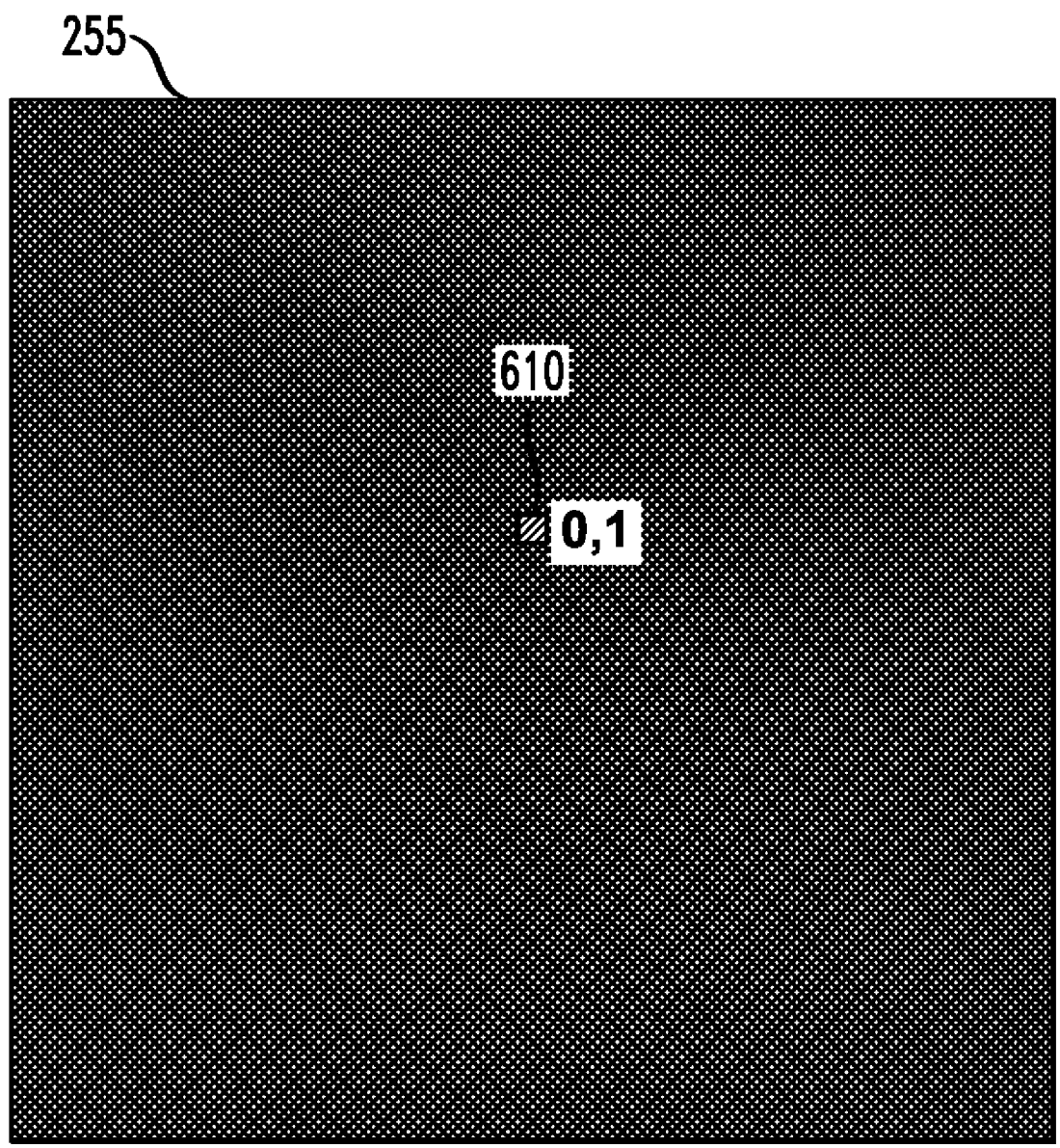
FIG. 6 illustrates a filter configured to pass $1^{st}$ order diffraction peaks at location (0,1)

FIG. 6 illustrates the filter 255 that is configured to pass only the (0,1) peak (FIG. 4). The filter 255 is often referred to as a spatial filter because it selectively removes a portion of image information that has been laterally spatially resolved, e.g., the diffraction peaks 340 (FIG. 3B). The spatial filter 255 may be, e.g., a glass plate with an opaque film through which one or more apertures 610 are formed.

Figure 1D:
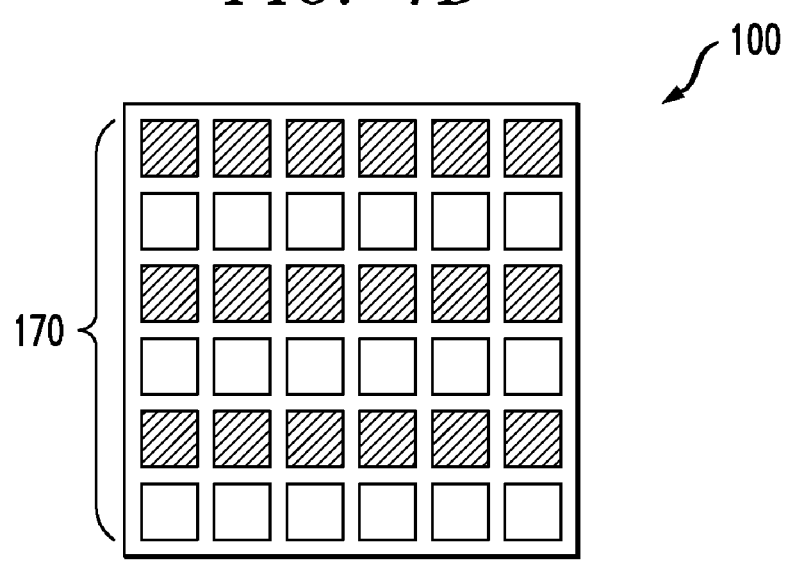
Figure 7:
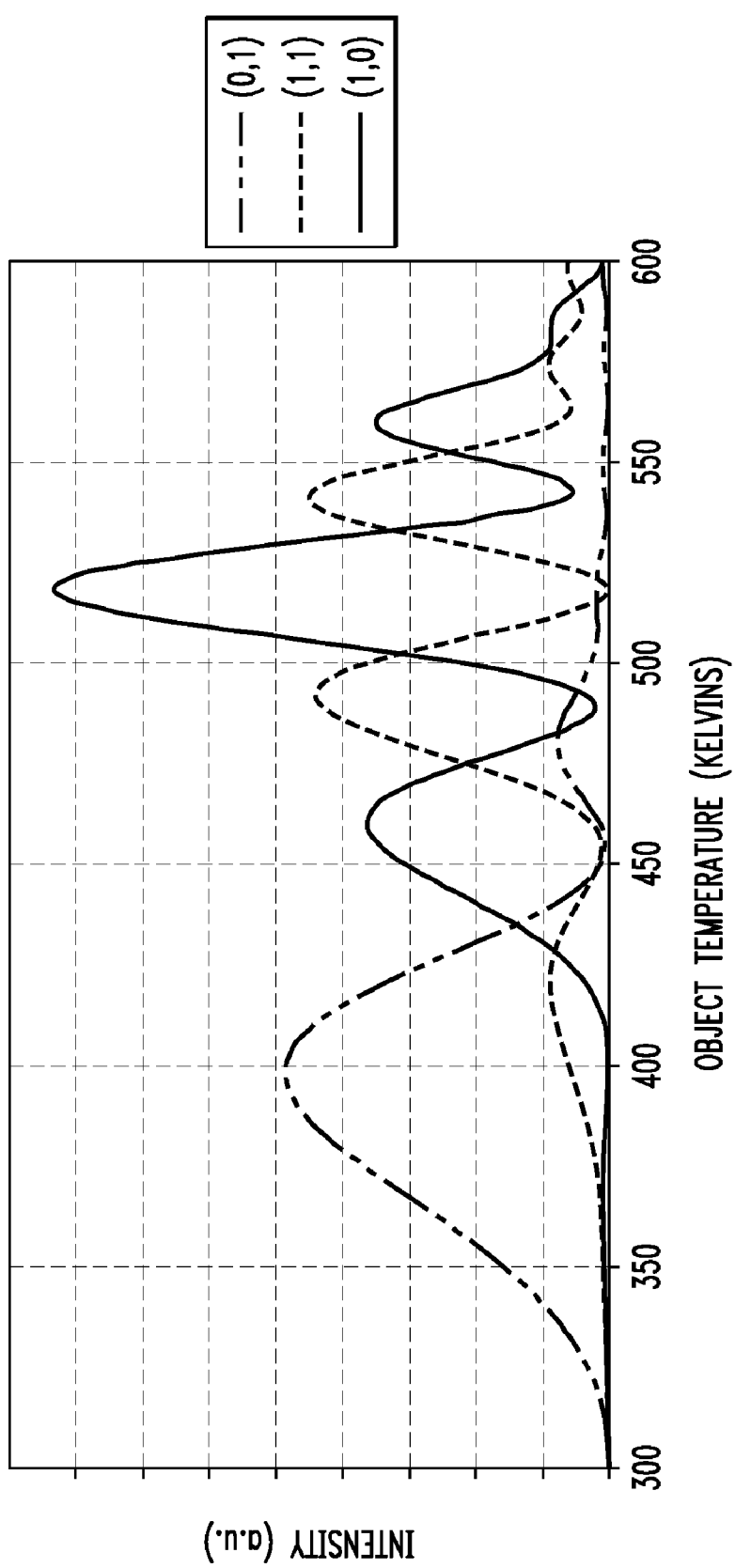
FIG. 7 illustrates a intensity response characteristic including the (0,1), (1,1) and (1,0) diffraction peaks of the specific illustrated embodiment.
Figure 8:
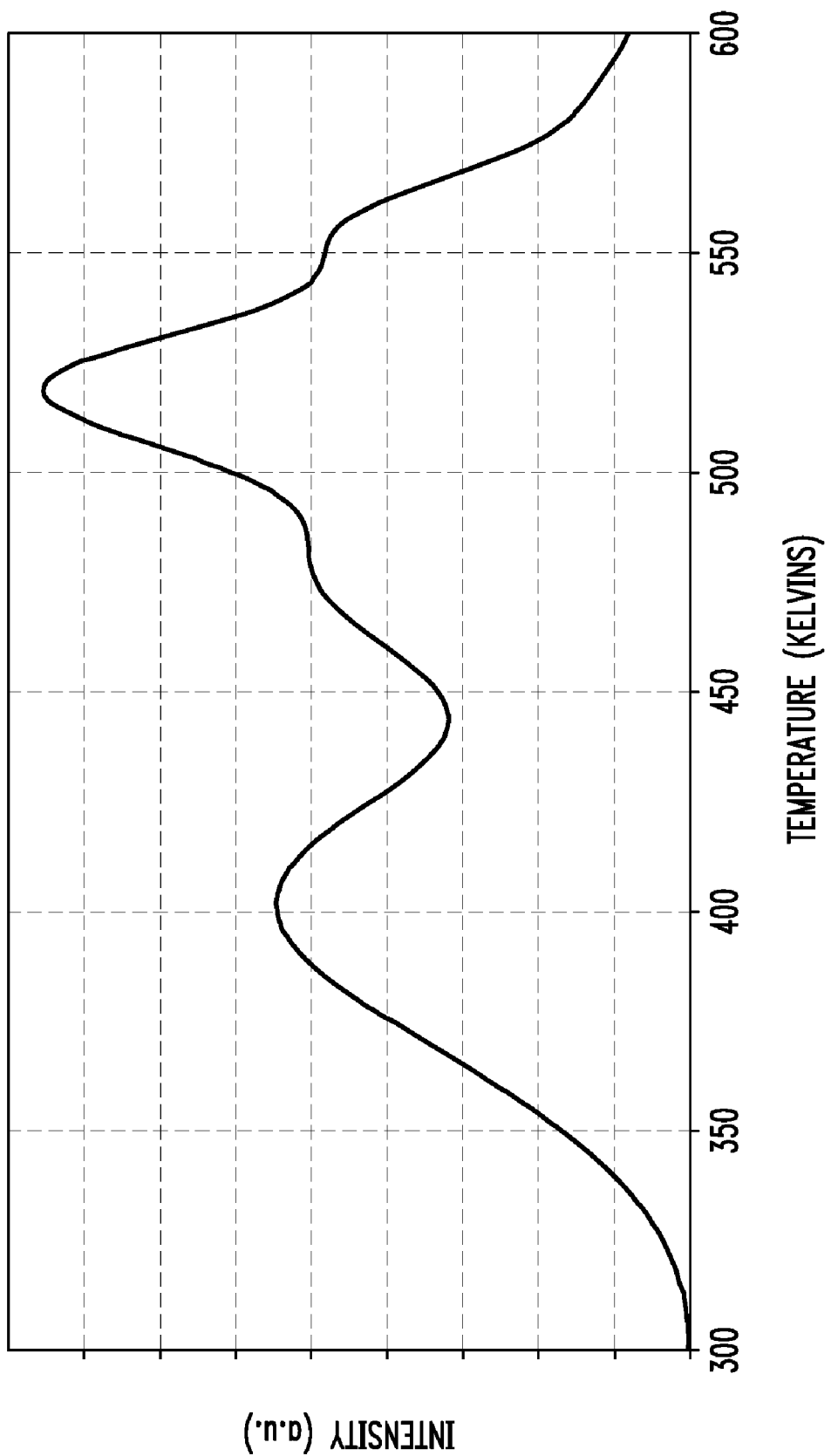
FIG. 8 illustrates a combined intensity response of unweighted (0,1), (1,1) and (1,0) order diffraction peaks.

One approach to increase the operating temperature range of the IR imager 200 might be to use, in addition to the (0,1) peak, other diffraction peaks in the distribution of diffraction peaks 340 (FIG. 3B) that have an intensity response over a different temperature range. FIG. 7 illustrates the responses of the intensity of the (0,1), (1,1) and (1,0) peaks as a function of object temperature for the linear mirror array 170 (FIG. 1D). The (1,1) and (1,0) peaks have a significant intensity response above 400 Kelvins. However, when the (0,1), (1,1) and (1,0) intensity responses are simply added, the combined intensity response illustrated in FIG. 8 results. The combined response increases monotonically from about 300 Kelvins to about 400 Kelvins, but has a local maximum response (rolls over) above 400 Kelvins. Unlike the (0,1) intensity response by itself (see, e.g., FIG. 5.), the combined intensity response has a significant response above 450 Kelvins, but is also nonlinear and non-monotonic up to a maximum response at about 520 Kelvins. The non-monotonic nature of the response creates an ambiguity when associating temperature with intensity. In many cases, these characteristics are undesirable or unacceptable for use in a thermal imager.

The present disclosure benefits from the recognition that the temperature range of the IR imager 200 may be extended without the aforementioned deficiencies of a simple combination of diffraction responses. Using the present example as a non-limiting illustration, by applying non-unity weights to one or more diffraction peaks in a combined response, the (0,1) peak may be combined with the (1,1) and (1,0) peaks with weighting coefficients chosen to produce a desirably smooth combined response characteristic.

Figure 9:
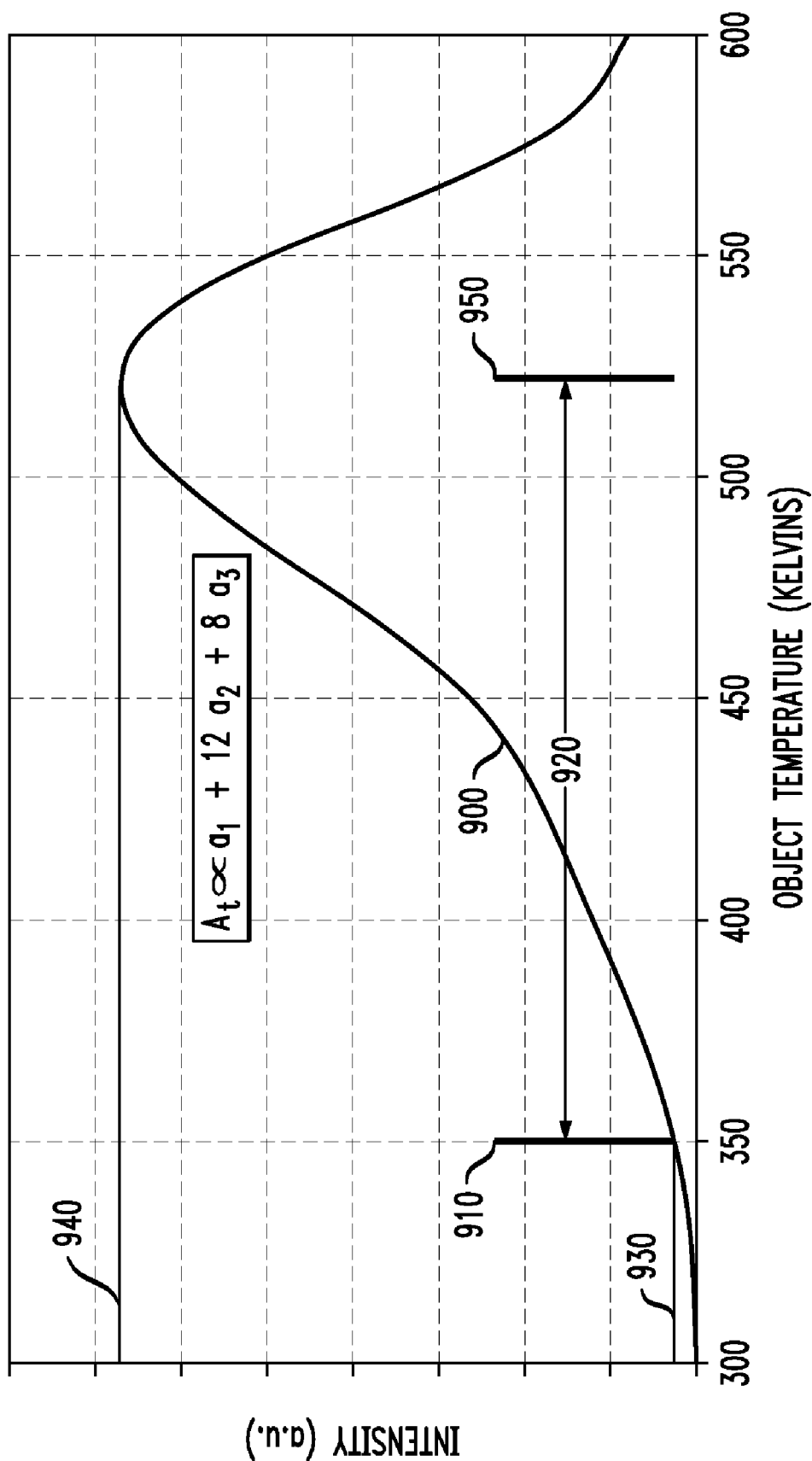
FIG. 9 illustrates a combined intensity response of weighted (0,1), (1,1) and (1,0) order diffraction peaks.

FIG. 9 illustrates an embodiment of a combined temperature response 900. More specifically, without limitation, in this embodiment the intensity functions of the (0,1), (1,1) and (1,0) peaks are weighted and combined as described by the intensity function $$A_T = a_1 + 12a_2 + 8a_3 \qquad \text{Eq. (1)}$$

or $$A_T \propto \frac{a_1}{12} + a_2 + \frac{2a_3}{3}, \qquad \text{Eq. (2)}$$

where $a_1$ is the intensity function of the (0,1) peak, $a_2$ is the intensity function of the (1,1) peak, and $a_3$ is the intensity function of the (1,0) peak. A lower temperature value 910 of an object temperature response 920 is the temperature associated with an intensity 930 that is about 5% of a maximum intensity 940, e.g., about 350 Kelvins. An upper temperature value 950 of the object temperature response 920 is the temperature associated with the maximum intensity 940, e.g., about 520 Kelvins. Thus the span of the object temperature response 920 is about 170 Kelvins. The combined temperature response 900 within this range is smooth and monotonic, e.g., does not exhibit rollover. The object temperature response 920 represents an increase of about 90 Kelvins over the object temperature response 520, more than doubling the temperature range of the IR imager 200 using only the (0,1) peak. Of course, the diffraction peaks selected and the weighting coefficients of the chosen peaks may be different in cases in which a different reconfigurable spatial light modulator geometry is used, or the optics of the IR imager are configured differently than in the IR imager 200.

Figure 10A:
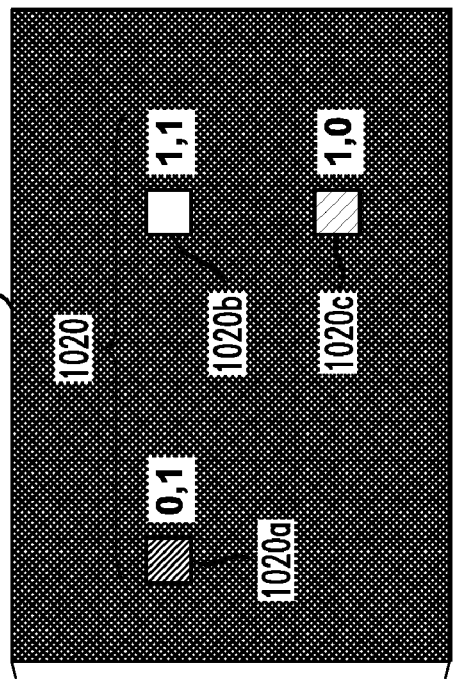
FIGS. 10A and 10B illustrate a filter configured to pass (0,1), (1,1) and (1,0) order diffraction peaks with different attenuation.

FIG. 10A illustrates an example configuration of the spatial filter 255 to implement Eq. 2. A detail 1010 illustrates in greater detail the area of the spatial filter associated with the (0,1), (1,0), and (1,1) peaks and apertures 1020 associated therewith. One aperture 1020 is associated with each of the (0,1), (1,0), and (1,1) peaks. Aperture 1020a is co-located with the (0,1) peak, aperture 1020b is co-located with the (1,1) peak, and aperture 1020c is co-located with the (1,0) peak. The locations coincident with all remaining peaks are opaque, indicating that essentially no light from these diffraction peak will be included in the image 262. Each aperture 1020a, 1020b, 1020c is configured to have non-zero transmittance.

In some embodiments, one or more apertures may be configured to attenuate the diffraction peak associated with that aperture. Attenuation may be described by an attenuation factor, e.g., a ratio of the light passed (transmitted) by the aperture to the light incident on the plane of the filter. The attenuation factor includes attenuation of a diffraction peak due to a filter substrate, e.g., glass, differences of thickness of the filter substrate, attenuation due to an attenuating layer on the substrate, and attenuation due to misalignment of the diffraction peak with the aperture. A particular attenuation factor may be generated by any one, or a combination of two or more, of the preceding factors.

The attenuation factor is the reciprocal of the transmission factor. The attenuation factor may range from zero, for which 100% of the incident light is passed, to unity, or 100%, for which no incident light is passed. In some cases, the attenuation factor excludes the effect of a substrate, e.g., glass, on which an attenuating layer is formed, and may range zero and unity, exclusive of zero and unity. The apertures may be configured to attenuate one or more diffraction peaks by a predetermined amount to implement a mixing function, e.g., Eq. 2.

Figure 11:
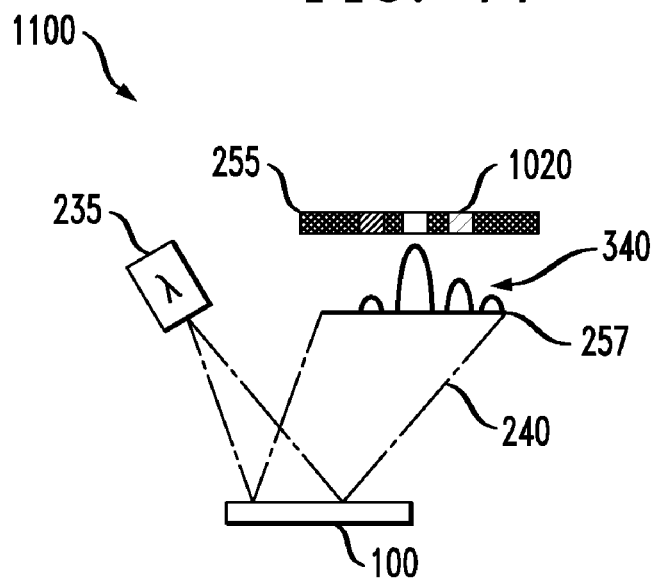
FIG. 11 illustrates an embodiment in which an example reconfigurable spatial light modulator is illuminated with only one wavelength of coherent light.

FIG. 11 presents a sectional view of an example configuration of the reconfigurable spatial light modulator 100, the coherent light source 235 and the spatial filter 255 as configured in FIG. 10A to further illustrate the relationship of the apertures 1020 and other elements. For clarity, only certain elements are shown. Coherent light 240 reflects from the pixel mirrors (not shown) of the reconfigurable spatial light modulator 100 and produces the diffraction pattern 340 at the focal plane 257. The diffraction pattern 340 may be a Fourier transform of an IR image projected on the pixel mirrors of the reconfigurable spatial light modulator 100. The filter 255 includes the apertures 1020, one or more of which may be configured to attenuate the intensity of the diffraction peak at that location.

Figure 10B:
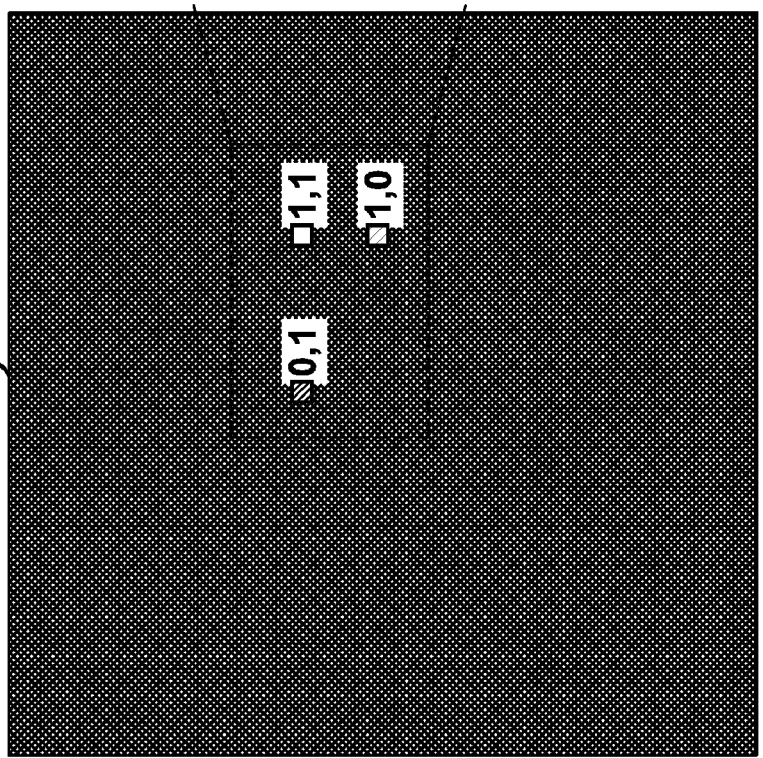

Returning to FIGS. 10A and 10B, in the example embodiment configured according to Eq. 2, the aperture 1020a passes about $\frac{1}{12}$, or about 8.3%, of the light from the (0,1) peak. The aperture 1020b passes about 100% of the light from the (1,1) peak. The aperture 1020c passes about $\frac{2}{3}$, or about 67%, of the light from the (1,0) peak. The total power of the light transmitted by the filter 255 onto a display is reduced by the loss of light stopped by the filter 255. When desired, the power of the coherent light source (e.g., the coherent light source 235 of FIG. 2A) may be increased to compensate for the lost power.

Figure 12:
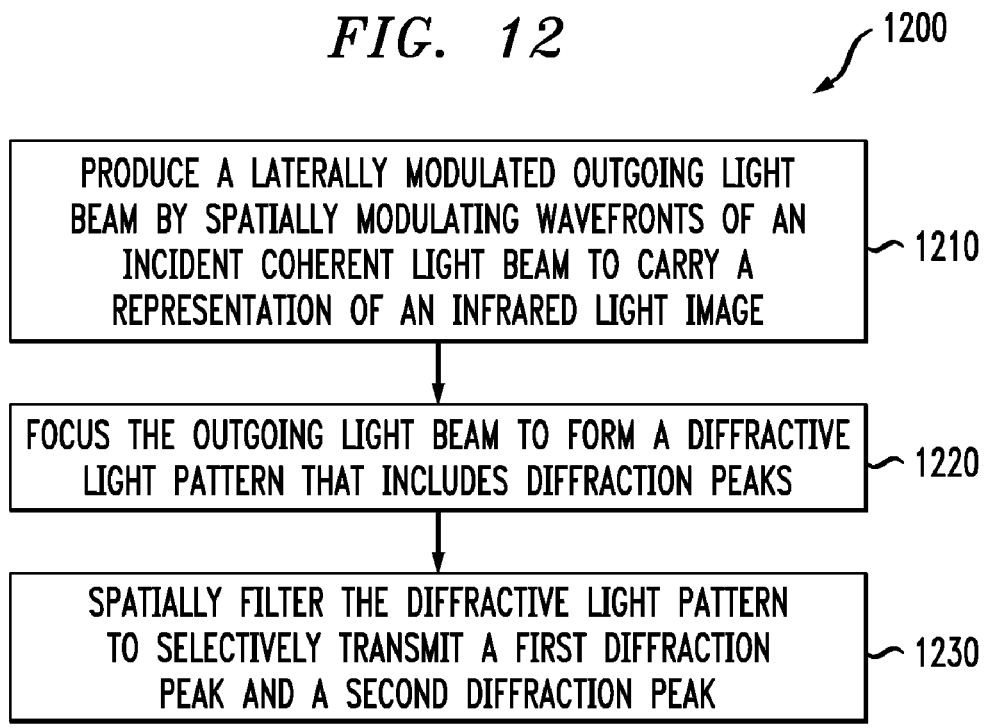
FIG. 12 illustrates a flow chart of an example method of the disclosure for producing a visible image from an IR image.

FIG. 12 presents a flow chart of an example method generally designated 1200 for producing a visible image from an IR image. In a step 1210, a laterally modulated outgoing light beam is produced by spatially modulating wavefronts of an incident coherent light beam to carry a representation of an infrared light image. In a step 1220, the outgoing light beam is focused to form a diffractive light pattern having diffraction peaks. In a step 1230, the diffractive light pattern is spatially filtered to selectively transmit a first diffraction peak and a second diffraction peak.

Figure 13A:
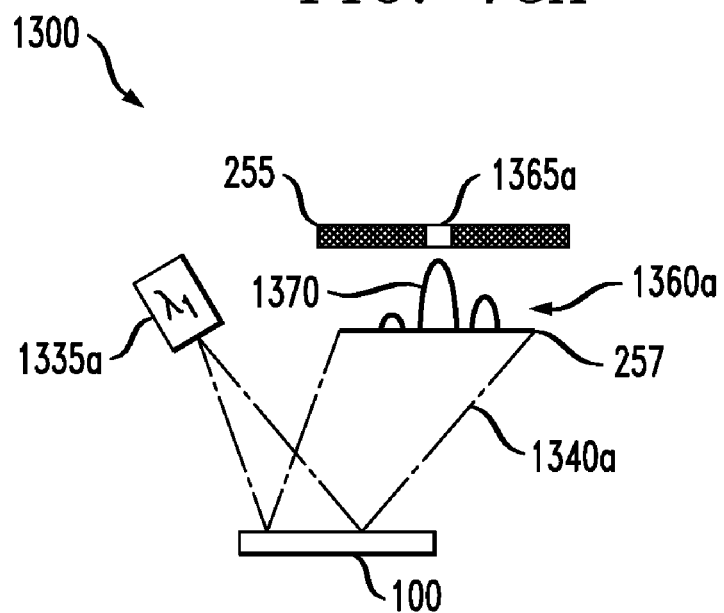
FIGS. 13A, 13B and 13C illustrate an embodiment in which a reconfigurable spatial light modulator is illuminated with three different wavelengths of coherent light.
Figure 13B:
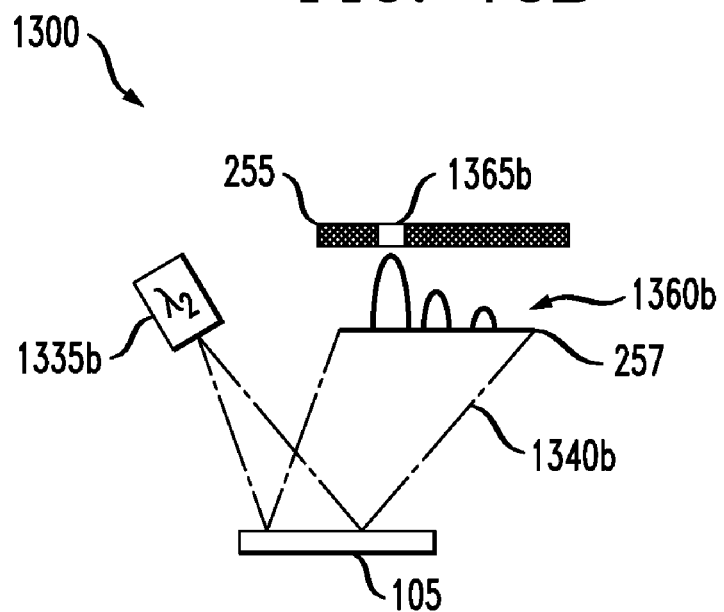
Figure 13C:
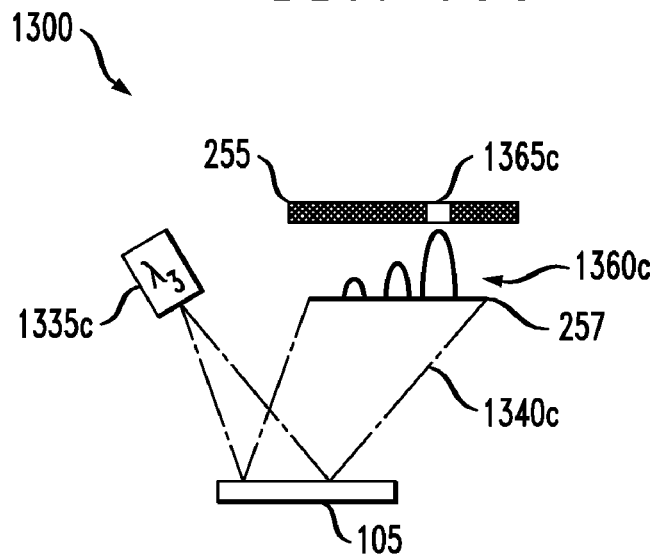

Turning now to FIGS. 13A, 13B and 13C, illustrated is an embodiment generally designated 1300 in which two or more coherent sources 1335 illuminate the reconfigurable spatial light modulator 100. The embodiment illustrates the non-limiting case for which three coherent sources are used. A coherent source 1335a outputs coherent light 1340a with a wavelength $\lambda_1$, a coherent source 1335b outputs coherent light 1340b with a wavelength $\lambda_2$, and a coherent source 1335c outputs coherent light 1340c with a wavelength $\lambda_3$. These coherent sources are collectively regarded as a single coherent source 1300. The coherent sources 1340a, 1340b, 1340c may be continuous wave or pulsed. The wavelengths $\lambda_1, \lambda_2, \lambda_3$ may be any different wavelengths. In one embodiment, $\lambda_1$, is selected from the red region of the visible spectrum, $\lambda_2$ is selected from the green region of the visible spectrum, and $\lambda_3$ is selected from the blue region of the visible spectrum. As used herein the red region of the visible spectrum ranges from about 750 nm to about 620 nm, the green region ranges from about 570 nm to about 495 nm, and the blue region ranges from about 495 nm to about 450 nm.

Reflection of each coherent source 1335a, 1335b, 1335c from the reconfigurable spatial light modulator 100 results in diffraction patterns 1360a, 1360b, 1360c, respectively at the focal plane 257. Each diffraction pattern 1360a, 1360b, 1360c includes a plurality of individual diffraction peaks. In general, some of the peaks in the diffraction patterns 1360a, 1360b, 1360c are spatially separated at the focal plane 257. One of the diffraction peaks in each diffraction pattern 1360a, 1360b, 1360c may be identified as providing a desired intensity-temperature response. The spatial filter 255 includes at least one aperture 1365 configured to pass at least one diffraction peak associated with each coherent source 1335a, 1335b, 1335c. Each of FIGS. 13A, 13B, 13C illustrates a different section through the filter 255, and in this nonlimiting example each section includes only one aperture, e.g., apertures 1365a, 1365b, 1365c.

Figure 14:
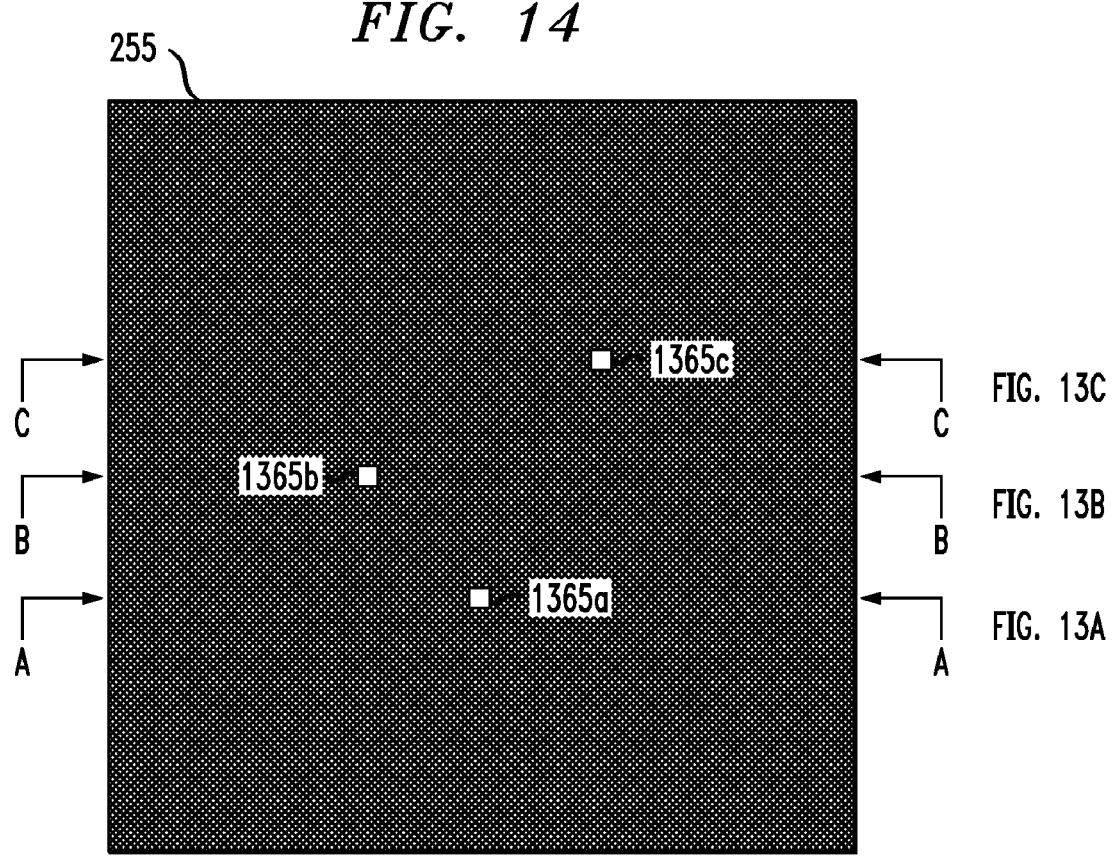
FIG. 14 illustrates an embodiment of an example filter of the disclosure configured to pass multiple diffraction peaks that are not spatially co-located.

The spatial relationship of the apertures 1365a, 1365b, 1365c in this illustrative example is illustrated in FIG. 14 in plan view. FIG. 13A corresponds to section A-A of FIG. 14, FIG. 13B corresponds to section B-B, and FIG. 13C corresponds to section C-C. The relative positions of the apertures 1365a, 1365b, 1365c in FIG. 14 are for illustration purposes only, and do not necessarily correspond to a specific configuration of a realized embodiment.

Returning to FIGS. 13A, 13B, 13C, each diffraction pattern 1360a, 1360b, 1360c represents a section through a two-dimensional pattern of diffraction peaks associated with the reflection of each of coherent light 1335a, 1335b, 1335c from the reconfigurable spatial light modulator 100. The diffraction pattern 1360a, e.g., may include a diffraction peak 1370 that provides a desired temperature response for the wavelength associated with the coherent source 1335a. Similarly, the diffraction patterns 1360b, 1360c may include a diffraction peak that provides a desired temperature response for the wavelength associated with the coherent sources 1335b, 1335c, respectively. In an advantageous embodiment, the wavelengths $\lambda_1, \lambda_2, \lambda_3$ are configured such that a diffraction peak may be selected from each diffraction pattern 1360a, 1360b, 1360c wherein each selected diffraction peak has a temperature response that includes a temperature range that is at least partially unique from the remaining peaks. In some embodiments, the temperature response range of each selected diffraction peak at least partially overlaps the temperature response range of another selected diffraction peak. When the diffraction peaks are configured in this manner, a null response may be avoided in a temperature response range of interest. In an advantageous embodiment, the selected diffraction peaks span an object temperature range greater than does any one diffraction peak alone.

Figure 15:
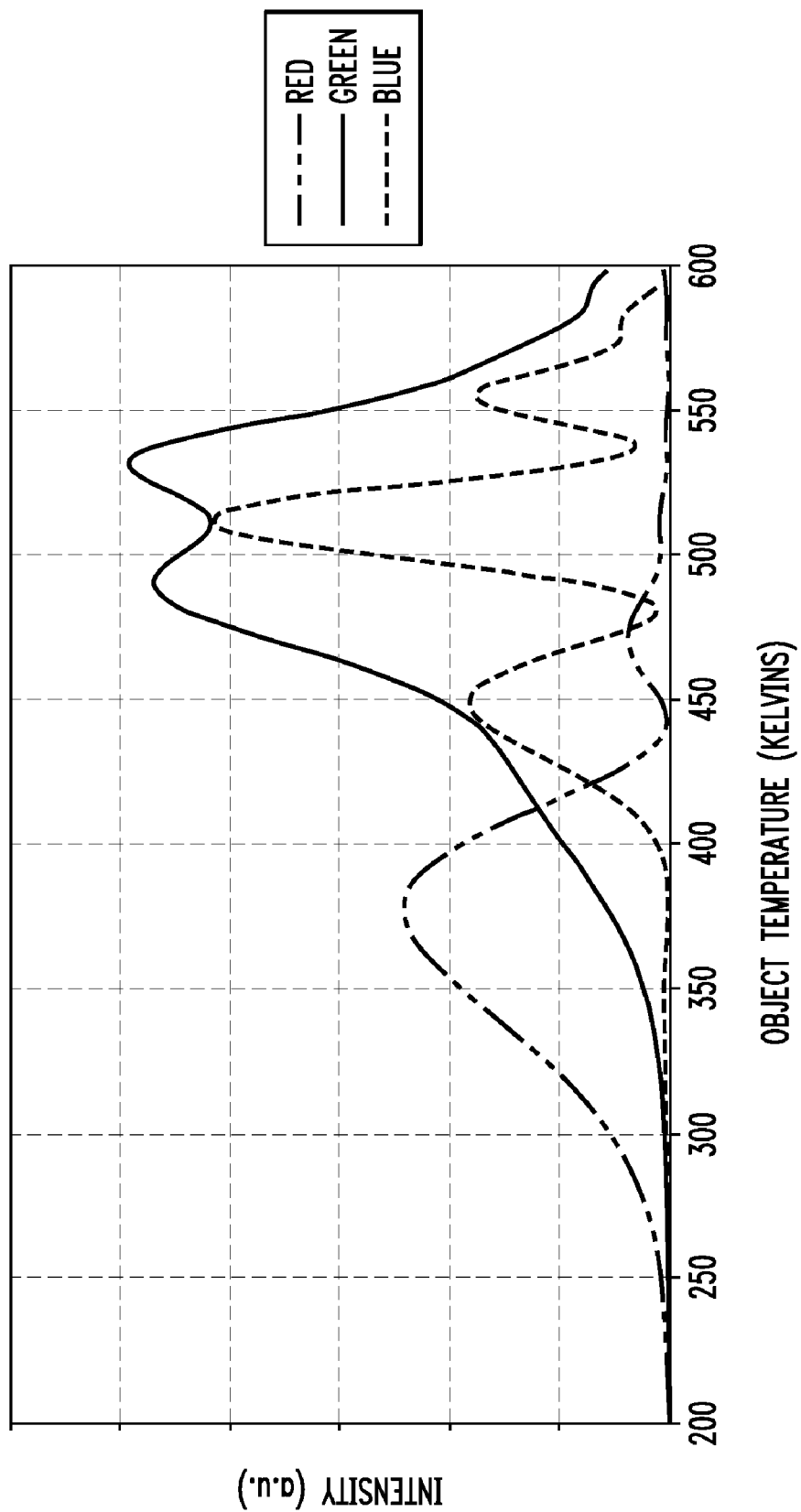
FIG. 15 illustrates example intensity response characteristics of the first order diffraction peaks of three different wavelengths of coherent light, e.g., red, green and blue.

FIG. 15 illustrates temperature responses for, e.g., three wavelengths, $\lambda_1, \lambda_2$, and $\lambda_3$ for the linear array 170. The responses are expected to differ for the checkerboard array 160 or configurations in which, e.g., the displacement of the pixel mirrors 120, 130 as a function of temperature differs from the present example. In the illustrated embodiment, $\lambda_1$ is about 650 nm (red), $\lambda_2$ is about 532 nm (green), and $\lambda_3$ is about 450 nm (blue). The intensity response of each wavelength varies from the temperature at which the intensity is 5% of the maximum intensity to the temperature associated with the maximum intensity. The red response characteristic ranges from about 260 Kelvins to about 420 Kelvins. The green response characteristic ranges from about 350 Kelvins to greater than 600 Kelvins with a bimodal distribution. The blue response characteristic ranges from about 410 Kelvins to about 580 Kelvins with a trimodal distribution. In the illustrated embodiment, as the object 220 temperature warms above about 260 Kelvins, an image of the object 220 initially appears red, since initially only the diffracted red light is used to form the image 262. As the object 220 warms above about 350 Kelvins, the image 262 includes diffracted green light. As the temperature increases further, the proportion of red and green light in the image 262 changes, so the observed color of the object 220 also changes. As the object 220 warms above about 420 Kelvins, the image 262 includes diffracted blue light. As the temperature increases still further, the proportion of red, green and blue light also changes, causing the observed color of the object 220 to change. Thus, the perceived color of the image 262 changes unambiguously over the temperature of the object 220 ranging from about 250 Kelvins to at least 500 Kelvins. In this manner, a false color image of the object 220 is generated in which the color is dependent on the temperature of the object 220 over a wide temperature range. Optionally, optical sources may be configured such that the colors of a false color image correspond to a particular color mapping, such as e.g., red to indicate a warmer temperature and blue to indicate a cooler temperature.

Figure 16A:
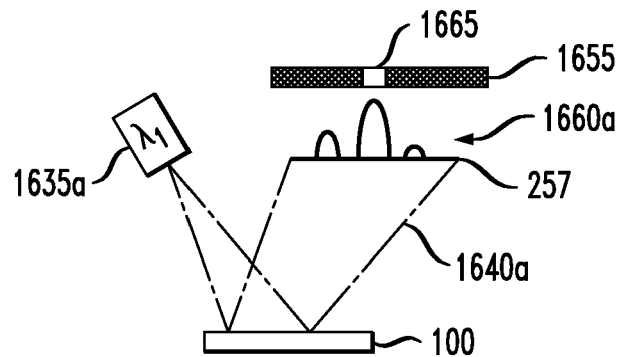
FIGS. 16A, 16B and 16C illustrate an example embodiment of the disclosure having three coherent light sources configured to produce co-located diffraction peaks and a spatial filter configured to pass the co-located diffraction peaks.
Figure 16B:
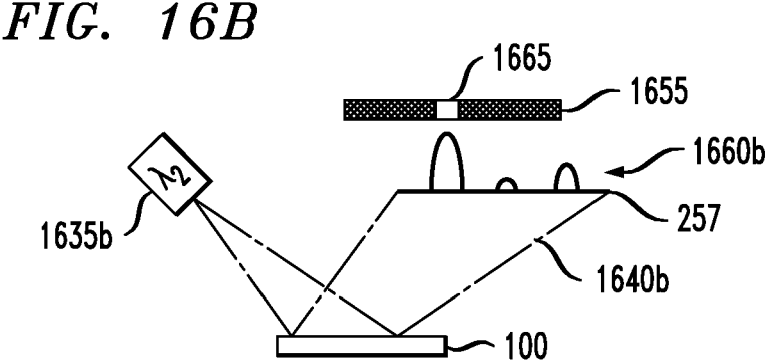
Figure 16C:
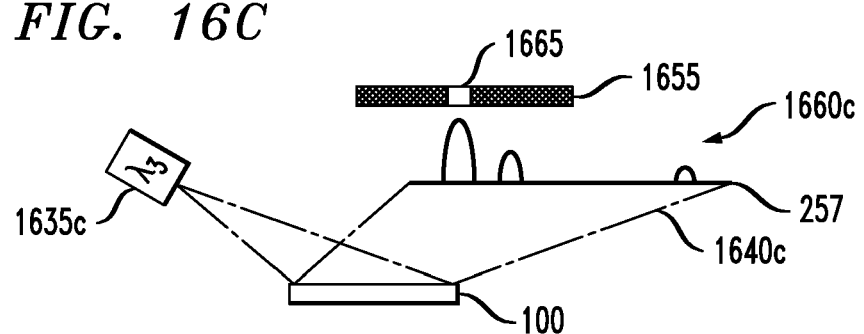

FIGS. 16A, 16B and 16C illustrate example embodiment of the spatial light modulator 100 in which multiple coherent light sources 1635 are used to form a visible image 262 of the object 220. In the illustrated embodiment, three coherent light sources 1635a, 1635b, 1635c illuminate a reconfigurable spatial light modulator 100. The coherent light sources 1635a, 1635b, 1635c have different wavelengths, which in some cases may include red, green and blue. The coherent light sources 1635a, 1635b, 1635c may be continuous wave or pulsed. Light from each coherent source 1635a, 1635b, 1635c diffracts from the reconfigurable spatial light modulator 100 to form diffraction patterns 1660a, 1660b, 1660c. The coherent light sources 1635a, 1635b, 1635c are configured to cause a desired preselected diffraction peak from each diffraction pattern 1660a, 1660b, 1660c to be co-located with a single aperture 1665 on a filter 1655. The single aperture 1665 may be used to create a false color image of the IR object in similar fashion to the embodiment 1300.

Each coherent source 1635a, 1635b, 1635c may be configured by, e.g., positioning the coherent source in azimuth and elevation with respect to the reconfigurable spatial light modulator 100. It is believed that two degrees of positional freedom are sufficient to configure the coherent sources 1635a, 1635b, 1635c to cause a desired diffraction peak from each diffraction pattern 1660a, 1660b, 1660c to be co-located at the aperture 1665. The resulting false color image may have similar or different color characteristics as those described with respect to the embodiment 1300. Other modifications may include, e.g., the number of coherent light sources and the wavelengths used.

FIG. 17 presents an example flow chart of a method 1700 for producing a visible image from an IR image using multiple wavelengths of visible light. In a step 1710, an infrared light image is received from which a laterally modulated outgoing light beam is produced. Wavefronts of an incident plurality of coherent light beams are spatially modulated to carry a representation of the image, wherein the coherent light beams have different wavelengths. In a step 1720, the outgoing light beam is focused to form a first diffractive light pattern of the modulated wavefront associated with a first frequency and a second diffractive light pattern of the modulated wavefront associated with a second frequency. In a step 1730, the first and second diffractive light patterns are spatially filtered to selectively transmit a plurality of diffraction peaks including a first diffraction peak with the first wavelength and a second diffraction peak with the second wavelength.

Those skilled in the art to which the invention relates will appreciate that other and further additions, deletions, substitutions and modifications may be made to the described embodiments without departing from the scope of the invention.

What is claimed is:

1. An apparatus, comprising:
a reconfigurable spatial light modulator configured to spatially modulate an incident wavefront responsive to an image formed on said modulator by a first light source;
a second light source configured to direct a coherent illumination light beam towards said modulator such that said modulator produces a modulated outgoing light beam therefrom; and
a filter configured to spatially filter a light pattern formed by said outgoing light beam on a plane to selectively transmit light from a plurality of diffraction peaks therein.

2. The apparatus as recited in claim 1, wherein said filter attenuates light of a first of said diffraction peaks with a first attenuation factor and light of a different second of said diffraction peaks with a different second attenuation factor.

3. The apparatus as recited in claim 2, wherein said first diffraction peak has a first wavelength and said second diffraction peak has a second different wavelength.

4. The apparatus as recited in claim 1, wherein said reconfigurable spatial light modulator comprises an array of pixel mirrors over a substrate surface, and said image is formed on a surface of said substrate opposite said array.

5. The apparatus as recited in claim 4, wherein said substrate has an optical pass band ranging in wavelength from about 1.5 µm to about 6 µm.

6. The apparatus as recited in claim 1, wherein said first light source emits infrared light, and said second light source emits visible light.

7. An apparatus, comprising:
a reconfigurable spatial light modulator configured to spatially modulate an incident wavefront responsive to an image from a first light source formed on said modulator;
a second light source configured to produce light including a first wavelength and a different second wavelength and to direct said produced light towards said reconfigurable spatial light modulator such that said modulator produces a modulated outgoing light beam therefrom; and
a filter configured to spatially filter a light pattern formed by said outgoing light beam along a plane to selectively transmit light from a plurality of diffraction peaks of said pattern such that light of said first wavelength is transmitted by a first of said diffraction peaks with a first attenuation and light of said different second wavelength is transmitted by a second of said diffraction peaks with a second attenuation.

8. The apparatus as recited in claim 7, wherein said first attenuation is different from said second attenuation.

9. The apparatus as recited in claim 7, wherein said apparatus is configured such that said first diffraction peak and said second diffraction peak are passed by a single aperture of said filter.

10. The apparatus as recited in claim 7, wherein said apparatus is configured such that said first diffraction peak is passed by a first aperture of said spatial filter, and said second diffraction peak is passed by a different second aperture of said filter.

11. The apparatus as recited in claim 7, wherein a state of said modulator is responsive to an intensity of infrared light in a wavelength range from about 3 µm to about 5.5 µm.

12. The apparatus as recited in claim 7, wherein said optical source produces light of a first wavelength in a range of about 620 nm to about 750 nm, light of a second wavelength in a range of about 495 nm to about 570 nm, and light of a third wavelength in a range of about 450 nm to about 495 nm.

13. The apparatus as recited in claim 7, wherein said apparatus is configured to produce a false color image in response to said modulating.

14. The apparatus as recited in claim 7, wherein said first light source emits infrared light, and said second light source emits visible light.

15. A method, comprising:
producing a laterally modulated outgoing light beam by spatially modulating wavefronts of an incident coherent light beam to carry a representation of an infrared light image;
focusing said outgoing light beam to form a diffractive light pattern having diffraction peaks; and
spatially filtering said diffractive light pattern to selectively transmit a first diffraction peak and a second diffraction peak.

16. The method as recited in claim 15, further comprising attenuating said first diffraction peak by a first attenuation factor and attenuating said second diffraction peak by a different second attenuation factor.

17. The method as recited in claim 15, wherein said first diffraction peak comprises light at a first wavelength and said second diffraction peak comprises light at a different second wavelength.

18. The method as recited in claim 17, wherein said first diffraction peak and said second diffraction peak are passed by a same aperture.

19. The method as recited in claim 15, further comprising transmitting said infrared light image through a substrate of a reconfigurable spatial light modulator.

20. A method, comprising:
- receiving an infrared light image and producing a laterally modulated outgoing light beam by spatially modulating wavefronts of an incident plurality of coherent light beams to carry a representation of said image, said coherent light beams having different wavelengths;
- focusing said outgoing light beam to form a first diffractive light pattern of said modulated wavefront associated with a first frequency and a second diffractive light pattern of said modulated wavefront associated with a second frequency; and
- spatially filtering said first and second diffractive light patterns to selectively transmit a plurality of diffraction peaks including a first diffraction peak with said first wavelength and a second diffraction peak with said second wavelength.

21. The method as recited in claim 20, wherein said spatial filtering passes said first diffraction peak with a first aperture, and passes said second diffraction peak with a different second aperture.

22. The method as recited in claim 21, wherein said first aperture has a different attenuation factor than said second aperture.

23. The method as recited in claim 20, wherein said receiving includes transmitting said image through a silicon layer.

24. The method as recited in claim 20, wherein said plurality of coherent light beams includes light of a first wavelength in a range of about 620 nm to about 750 nm, light of a second wavelength in a range of about 495 nm to about 570 nm, and light of a third wavelength in a range of about 450 nm to about 495 nm.

25. The method as recited in claim 20, further comprising forming a visible false color image from said spatially filtered first and second diffractive light patterns.

* * * * *